Patented Aug. 21, 1951

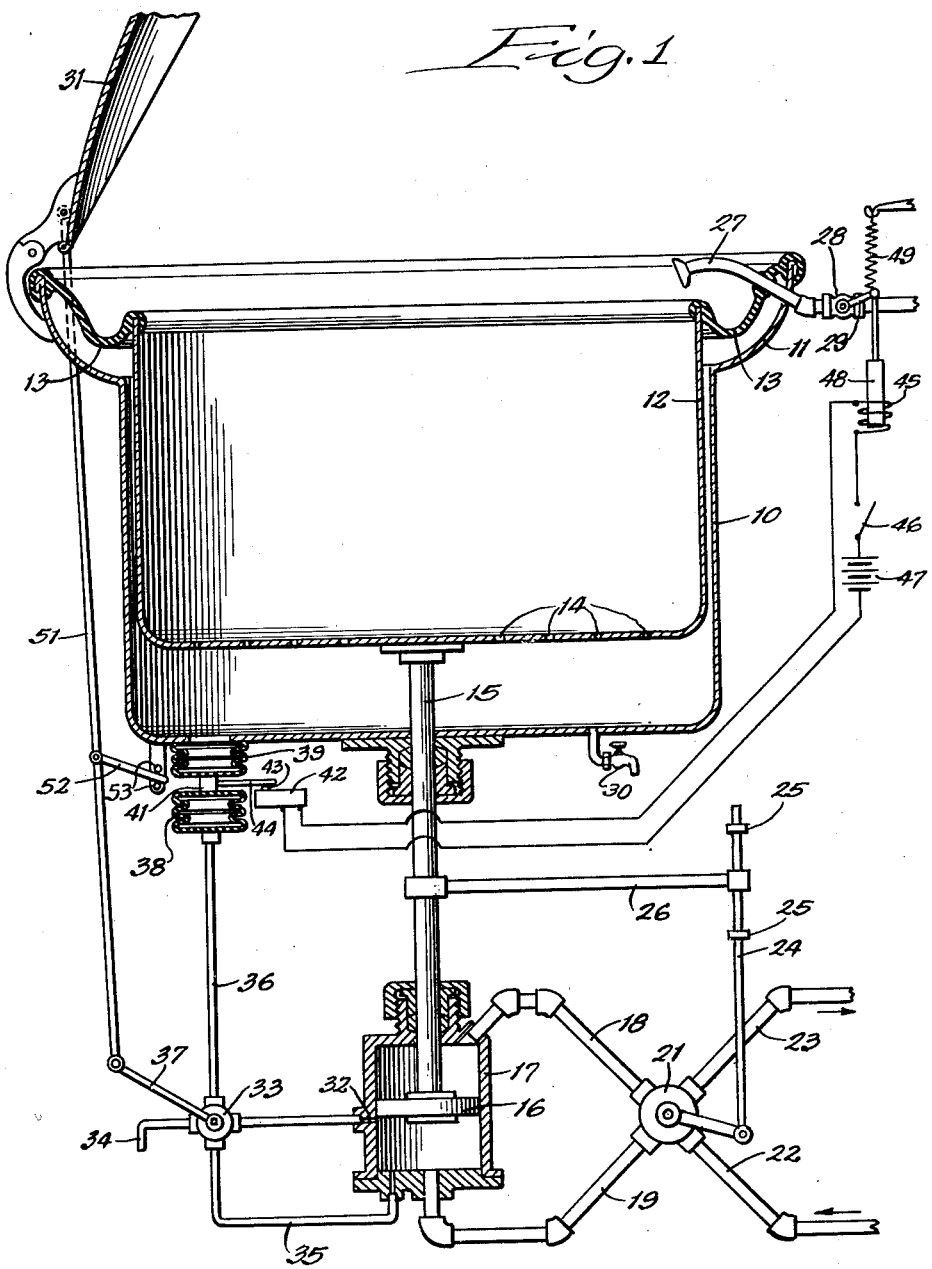

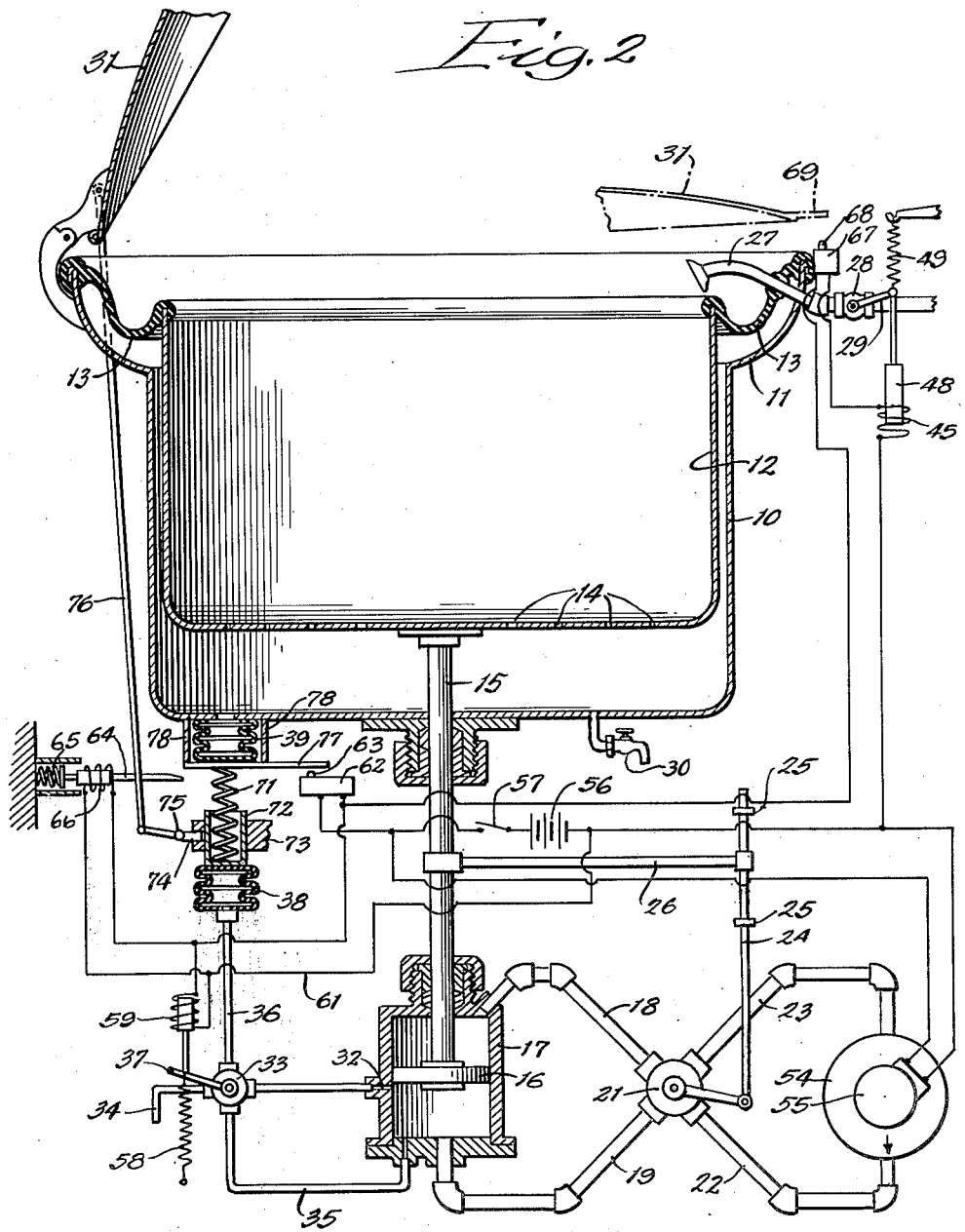

2,565,150

UNITED STATES PATENT OFFICE 2,565,150

LIQUID CONTROL FOR TEXTILE WASHING MACHINES

Sterling O. Stageberg, Minneapolis, Minn.

Application June 11, 1945, Serial No. 598,772

21 Claims. (Cl. 68—156)

This invention relates to apparatus for cleaning textiles and more particularly to apparatus for laundering clothes and like textile fabrics.

In cleaning machines such as conventional washing machines, it has been the usual practice to fill the machine to a predetermined level with water or other detergent liquid under either manual or automatic control. It is obvious that less liquid is required to clean a small batch of textiles than a large batch so that in conventional machines an excessive quantity of liquid is used when cleaning a relatively small batch of textiles. In washing machines, this results in a waste of hot water and of the soap or other detergent materials required to bring the water to the desired cleaning strength.

It is accordingly one of the objects of the present invention to provide apparatus for cleaning textiles in which the quantity of detergent liquid employed is automatically controlled in proportion to the quantity of textiles to be cleaned.

A specific object is to provide a washing machine in which the quantity of water supplied is automatically controlled in proportion to the weight of textiles to be washed.

Another object is to provide apparatus for cleaning textiles in which the supply of detergent liquid is automatically controlled in response to the balance of forces proportional to the weight of textiles and the head of liquid in the apparatus.

Still another object is to provide apparatus for cleaning textiles in which the motor which operates the apparatus serves also to weigh the textiles in the apparatus. According to one feature, the motor holds the textiles on a movable partition, or the like, in the tub and the force exerted by the motor is utilized as a controlling force to determine the quantity of liquid to be supplied.

Still another object is to provide apparatus for cleaning textiles in which the textiles are weighed dry in the apparatus and liquid is thereafter added in a quantity automatically proportioned to the weight of the textiles. In one desirable construction, the supply of liquid is started by closing a cover on the apparatus and is stopped automatically when the desired quantity of liquid has been supplied.

A further object is to provide apparatus for cleaning textiles in which operation of the motor is prevented during the addition of liquid and is started to effect a cleaning operation when the desired quantity of liquid is in the apparatus.

A still further object is to provide apparatus for cleaning textiles in which a control device responsive to the head of liquid in the apparatus is latched to prevent damage thereto during the cleaning operation.

The above and other objects and advantages of the invention will be more readily apparent from the following description when read in connection with the accompanying drawing, in which—

Figure 1 is a diagrammatical sectional view of one form of apparatus embodying the invention and Figure 2 is a view similar to Figure 1 of an alternative construction.

The apparatus, as illustrated, is generally similar to that more particularly described and claimed in my co-pending application Serial No. 595,979, filed May 26, 1945, now Patent No. 2,522,- 806, dated September 19, 1950, and may operate in the same general manner to effect a cleaning, a rinsing and a drying operation. As shown, the apparatus comprises a vertical cylindrical tub 10 flared at its top as indicated at 11. A cylindrical container 12 is mounted in the tub and is sealed to the upper end of the tub by a flexible annular sealing strip 13. The flat horizontal bottom of the container 12 is perforated, as indicated at 14, to provide for flow of cleaning liquid and air therethrough. The container is adapted to be moved vertically in the tub by a piston rod 15 connected to a piston 16 which is slidable in a cylinder 17 mounted below the tub. Actuating fluid is supplied to the cylinder 17 through pipes 18 and 19 connected to the opposite ends of the cylinder and to a reversing valve 21. A fluid supply pipe 22 and an exhaust pipe 23 are connected to the reversing valve. The valve 21 is controlled by a rod 24 having spaced stops 25 thereon adapted to be engaged by an arm 26 on the piston rod 15. With this construction during normal operation the valve 21 will be reversed at the opposite ends of the piston stroke so that the piston will reciprocate the container 12 in the tub.

Liquid, such as water, is adapted to be supplied to the tub through a nozzle 27 discharging into the upper end of the container under the control of a valve 28. The valve is provided with an operating arm 29 adapted, when in the raised position shown in Figure 1, to close the valve and, when lowered, to open the valve. The liquid may be drained from the tub through a drain valve 30. The tub is adapted to be closed by a hinged cover 31 hinged at one side thereof and latched in closed position by any suitable latching means, not shown.

The weighing mechanism

In order to weigh the quantity of textiles in the apparatus, the cylinder 17 is provided with a port 32 intermediate its ends connected through a valve 33 to a discharge pipe 34 which may discharge into a sump or the like. The valve 33 is preferably a double valve, one-half of which controls the connection between the port 32 and the pipe 34 and the other half of which controls the connection between a pipe 35 connected to the bottom of the cylinder 17 and a pipe 36. The valve 33 is operated by a lever 37 so that both portions thereof are opened when the lever is raised to the position shown and both portions are closed when the lever is lowered.

The pipe 36 is connected to an expansible chamber, shown as a flexible bellows 38, which is adapted to expand upwardly upon an increase in pressure. A second similar bellows 39 is connected to the lower part of the tub 10 to expand in response to the head of liquid in the tub. The bellows 38 and 39 are connected by a block 41 to oppose each other so that the position of the block will depend upon the balance of the forces exerted by the bellows.

Movement of the bellows is adapted to control a switch 42, such as a conventional microswitch which is normally closed and which opens when an operating button 43 thereon is depressed. An arm 44 carried by the block 41 is adapted to engage and depress the button 43 when the arm moves downwardly. The switch 42 is connected in circuit with a solenoid 45 and a manual control switch 46 to a source of power indicated as a battery 47. A core 48 is movable in the coil 45 to be moved downwardly when the coil is energized and is connected to the valve operating arm 29. A spring 49 normally urges the arm 29 upward to the position shown.

Operation

In operation of the apparatus with the valve 33 in its open position to connect the port 32 and the pipe 34 and to connect the pipes 35 and 36, the piston 16 will be raised substantially to the position shown in which it partially uncovers the port 32. When this port is uncovered, fluid will be exhausted beneath the piston through the valve 33 and pipe 34 so that the piston will remain in the position shown. At the same time, the switch 46 is closed to energize the coil 49 and open the supply valve 28 to supply water to the tub. Textiles placed in the container will eventually be covered by the water but will exert a downward force on the container equal to the unsuspended weight of the textiles. This force tends to depress the piston 16 to close the port 32 but as soon as this port is restricted, pressure builds up below the piston 16 until a balance is reached between the downward force caused by the weight of the textiles and the pressure acting on the piston. It will be seen, therefore, that the pressure acting on the piston 16 is an accurate measure of the weight of the textiles in the container.

This pressure is transmitted through the pipes 35 and 36 to the bellows 38 causing it to expand upwardly against the bellows 39. As water continues to flow into the tub, the bellows 39 will exert a greater force until it moves the arm 44 downwardly against the bellows 38 to engage the switch operating button 43 and open the switch 42. At this time the solenoid 45 will be deenergized and the spring 49 will close the valve 28. The closing of the valve 28 is therefore controlled in response to the balance between forces proportional respectively to the weight of textiles in the container and the head of liquid in the tub. By this means the liquid in the tub can be accurately proportioned to the weight of the textiles to be cleaned for optimum results.

After the supply of water is interrupted, the cover 31 of the tub is closed to start the cleaning operation. As shown, the cover is connected through a link 51 to the lever 37 so that when the cover is closed, the valve 33 will move to its closed position to interrupt communication between port 32 and pipe 34 and between pipes 35 and 36. As soon as the valve 33 is closed, flow of liquid through the port 32 is stopped so that the piston 16 will move up to its extreme upper position and will start reciprocating in the normal manner to effect a cleaning operation. Thereafter, the operation may be continued in the manner described in my co-pending application Serial No. 595,979 (now abandoned).

In order to prevent damage to the bellows 39 during a cleaning operation due to pressure surges in the tub, latching means are provided to hold this bellows during such operation. As shown, the latching means comprise a bar 52 slidably supported between spaced rods 53 supported by a bracket on the tub. The outer end of the bar 52 is pivotally connected to the link 51 so that when the cover 31 is opened, the bar will be withdrawn to the position shown to free the bellows 39. When the cover is closed at the start of a cleaning operation, the bar 52 will slide through the rods 53 into engagement with the lower surface of the bellows 39 to latch the bellows in substantially collapsed position. The bellows will, therefore, not expand and contract during pressure changes occurring in a cleaning operation so that the bellows will not be damaged.

The embodiment of Figure 2

Figure 2 illustrates an alternative construction in which the textiles are weighed dry and the amount of liquid supplied to the tub is proportioned to the dry weight of the textiles. Parts of the washing machine construction proper in this figure which are identical with like parts in the construction in Figure 1 are indicated by the same reference numerals. As shown in this construction, operating liquid is supplied to the cylinder 17 by a pump 54 driven by an electric motor 55. The motor is connected across a source of electric current indicated as a battery 56 through a manual control switch 57 so that when the switch 57 is closed the motor 55 will operate the pump to deliver fluid under pressure to the system.

The double valve 33 is normally urged to its closed position by a spring 58 and is adapted to be opened by a solenoid 59 which is shown in Figure 2 in the valve opening position. The solenoid 59 is connected at one side to a wire 61 leading to one side of the battery and at its other side is connected to an automatic control switch 62 which is connected through the switch 57 to the battery. The switch 62 is similar to the switch 42 of Figure 1 and is normally closed to be opened when an operating button 63 thereon is depressed. The bellows 39 is adapted to be latched during operation of the machine by a latch 64 urged to a latching position beneath the bellows by a spring 65 and adapted to be withdrawn by a solenoid 66 connected in parallel with the solenoid 59. The solenoid 45 which controls the water inlet valve 28 is connected in parallel with the solenoids 59 and 66 through a normally open switch 67. The switch 67 has an operating button 68 adapted to be closed by a projecting finger 69 on the cover 31 when the cover is closed so that the solenoid 45 will not be energized to open the valve 28 until the cover is closed.

The bellows 38 and 39 are connected by a spring 71 which engages bellows 38 at one end and bellows 39 at its opposite end. The lower end of the spring is supported by a cup 72 which is slidable in a supporting bracket 73 and which is adapted to be latched in adjusted position by a latch member 74 controlled by a cam 75. The cam 75 is operated by the cover 31 through a link 76 so that when the cover is open the latch will be released to free the sleeve 72 and when the cover is closed, the latch will be engaged to hold the sleeve 72 in adjusted position.

The bellows 39 carries a crossbar 77 which is adapted to engage the switch operating button 63. Fixed stop members 78 are provided on the tub around the bellows 39 to engage the crossbar 77 and limit upward movement thereof when the bellows 39 is collapsed. In operation of this construction, the cover 31 is opened so that the textiles to be cleaned can be placed in the container 12 and the manual switch 57 is closed to start operation of the motor 55. With the textiles in the container the piston 16 will rise partially to uncover the port 32 so that a pressure will be produced in the lower end of the cylinder 17 which is proportional to the dry weight of the textiles in the container. It will be noted that the valve 28 is closed at this time due to opening of the switch 67 when the cover is raised. However, both solenoids 59 and 66 will be energized to open the double valve 33 and to withdraw the latch 64.

The pressure in the lower end of the cylinder 17 will be transmitted through the pipes 35 and 36 and the valve 33 to the bellows 38 to expand at an amount proportional to the pressure. This will raise the sleeve 72 to an adjusted position which is proportional to the pressure in the cylinder and in turn to the weight of textiles in the container. When the container has been filled with textiles to the desired extent, the cover 31 is closed to engage the latch 74 with the sleeve 72 and to hold the spring 71 in its adjusted position. In this position, the spring 71 will exert an upward force on the bellows 39 which is proportional to the weight of the textiles in the container. It will be noted that the fixed stops 78 cause the bellows 38 to work against a fixed spring adjustment at all times so that the sleeve 72 will be accurately positioned in accordance with the weight of the textiles.

As soon as the cover is closed, the finger 69 will engage the switch operating button 68 to close the switch 67 and complete a circuit through the solenoid 45. At this time, the water valve 28 will be opened to admit water to the tub. As the water rises in the tub, the head of water acting on the bellows 39 expands it against the spring 71 until the arm 77 engages the switch operating button 63 to open the switch 62. It will be observed that the head of water required so to expand the bellows 39 is determined by the adjustment of the spring 71 so that the amount of water supplied will be proportional to the weight of the textiles in the container.

When the switch 62 is opened, it will interrupt the circuits to the three solenoids 45, 59 and 66 simultaneously to close the valve 28 and the double valve 33 and to permit the spring 65 to move the latch 64 into engagement with the bellows 39. As soon as the valve 33 is closed, the port 32 becomes ineffective and the piston 16 starts to reciprocate in the cylinder to effect a cleaning operation, as described in my above identified application.

While two embodiments of the invention have been shown and described in detail, it will be understood that these are illustrative only and are not intended as a definition of the scope of the invention, reference being had for this purpose to the appended claims.

What is claimed is:

1. Apparatus for cleaning textiles comprising a tub adapted to contain detergent liquid, means to supply detergent liquid to the tub, means movably mounted in the tub to support the textiles to be cleaned therein, means controlled by the last named means to produce a force proportional to the weight of textile supported by the last named means, means responsive to the head of liquid in the tub to produce a force opposing the first named force, and means movable in response to the resultant of said forces to control the supply of liquid to the tub.

2. Apparatus for cleaning textiles comprising a tub adapted to contain detergent liquid, means to supply detergent liquid to the tub, means movably mounted in the tub to support the textiles to be cleaned therein, means controlled by the last named means to produce a fluid pressure proportional to the weight of textiles supported by the last named means, an expansible chamber connected to the last named means to be expanded by the fluid pressure, an expansible chamber connected to the tub to be expanded by the head of liquid therein and opposing the first named expansible chamber, and means controlled by movement of the expansible chambers to control the supply of liquid to the tub.

3. Apparatus for cleaning textiles comprising a substantially vertical tub adapted to contain a detergent liquid, a generally horizontal partition movable vertically in the tub to support the textiles therein, a motor to move the partition vertically in the tub, means to supply an operating force to the motor, a control device for the motor to cause it to hold the partition in an intermediate vertical position in the tub, means to supply detergent liquid to the tub, and means responsive to the operating force supplied to the motor when it is holding the partition in said intermediate position and to the head of liquid in the tub to control the supply of detergent liquid to the tub.

4. Apparatus for cleaning textiles comprising a substantially vertical tub adapted to contain a detergent liquid, a generally horizontal partition movable vertically in the tub to support the textiles therein, a motor to move the partition vertically in the tub, means to supply an operating force to the motor, a control device for the motor to cause it to hold the partition in an intermediate vertical position in the tub, means to supply detergent liquid to the tub, means responsive to the operating force supplied to the motor when it is holding the partition in said intermediate position to produce a force proportional to the force exerted by the motor, means connected to the tub and opposing the last named means to produce a force proportional to the head of liquid in the tub, and means responsive to the resultant of the last two named means to control the supply of liquid to the tub.

5. Apparatus for cleaning textiles comprising a substantially vertical tub, means to supply liquid to the tub, a generally horizontal partition movable vertically in the tub, a fluid motor connected to the partition to reciprocate it in the tub, means to supply operating fluid to the motor, the motor including means to regulate the fluid pressure therein with the partition in an intermediate position in the tub whereby the regulated motor pressure will be proportional to the weight of textiles carried by the partition, and means communicating with the tub and motor and jointly responsive to said regulated motor pressure and the head of liquid in the tub to control the supply of liquid to the tub.

6. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, and means responsive to the pressure in the cylinder when the port is open and to the head of liquid in the tub to control the supply of liquid to the tub.

7. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device connected to the cylinder below the port to produce a force proportional to the pressure in the cylinder when the port is open, a second pressure responsive device connected to the tub to produce a force proportional to the head of liquid in the tub opposing the first named force, and means controlled by said devices in accordance with the resultant of said forces to control the supply of liquid to the tub.

8. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a hinged cover for the tub, a connection from the cover to the valve whereby the valve will be open when the cover is open and closed when the cover is closed, and means responsive to the pressure in the cylinder and to the head of liquid in the tub when the valve is open to control the supply of liquid to the tub.

9. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device, means including a valve connecting the pressure responsive device to the cylinder, means simultaneously to open and close both of said valves, and means controlled by the pressure responsive device and by the head of liquid in the tub to control the supply of liquid to the tub.

10. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device, means including a valve connecting the pressure responsive device to the cylinder, a hinged cover for the tub, a connection from the cover to said valves to open the valves when the cover is open and close the valves when the cover is closed, and means controlled by the pressure responsive device and the head of liquid in the tub to control the supply of liquid to the tub.

11. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device, means connecting the device to the cylinder to be responsive to the pressure therein when the valve is open, a spring connected to the pressure responsive device to be adjusted thereby, a second pressure responsive device connected to the tub to be urged in one direction by the head of liquid therein, the spring engaging the second device to urge it in the other direction, and means controlled by movement of the second device to control the supply of liquid to the tub.

12. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device, means connecting the device to the cylinder to be responsive to the pressure therein when the valve is open, a spring connected to the pressure responsive device to be adjusted thereby, a hinged cover for the tub, means operated by the cover to latch the spring in adjusted position when the cover is closed, a second pressure responsive device connected to the tub to be urged in one direction by the head of liquid therein, the spring engaging the second device to urge it in the other direction, and means controlled by movement of the second device to control the supply of liquid to the tub.

13. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device, means including a valve connecting the pressure responsive device to the cylinder below the port, a second pressure responsive device connected to the tub to be responsive to the head of liquid therein, means controlled jointly by the pressure responsive devices to control the supply of liquid to the tub, latching means for latching the second pressure responsive device and means for simultaneously operating the valves and the latching means.

14. Apparatus for cleaning textiles comprising a substantially vertical tub, means to supply liquid to the tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device, means including a valve connecting the pressure responsive device to the cylinder, a second pressure responsive device connected to the tub to be responsive to the head of liquid therein, means controlled jointly by the pressure responsive devices to control the supply of liquid to the tub, latching means for latching the second pressure responsive device, a hinged cover for the tub, and connections from the cover to the valves and the latching means simultaneously to operate them.

15. Apparatus for cleaning textiles comprising a tub adapted to contain detergent liquid, means to supply liquid to the tub, means mounted for vertical movement in the tub to support textiles therein, a spring, means controlled by the last named means to adjust the spring in accordance with the weight of textiles supported by the last named means, a pressure responsive device connected to the tub and responsive to the head of liquid in the tub, the spring opposing movement of the pressure responsive device in response to the head of liquid in the tub, and means controlled by movement of the pressure responsive device to control the supply of liquid to the tub.

16. Apparatus for cleaning textiles comprising a tub adapted to contain detergent liquid, means to supply liquid to the tub, means mounted for vertical movement in the tub to support textiles therein, a spring, means controlled by the last named means to adjust the spring in accordance with the weight of textiles supported by the last named means, a hinged cover for the tub, latching means for the spring to hold it in adjusted position, a connection between the cover and the latching means to actuate the latching means when the cover is closed, a pressure responsive device connected to the tub and responsive to the head of liquid in the tub, the spring opposing movement of the pressure responsive device in response to the head of liquid in the tub, and means controlled by movement of the pressure responsive device to control the supply of liquid to the tub.

17. Apparatus for cleaning textiles comprising a tub adapted to contain detergent liquid, means movably mounted in the tub to support textiles therein, means controlled by said means in accordance with the weight of textiles supported thereby to produce a controlled pressure, a pressure responsive device connected to the last named means to respond to the controlled pressure, a second pressure responsive device connected to the tub to respond to the head of liquid therein, the pressure responsive devices opposing each other, means including a valve to supply liquid to the tub, and means jointly responsive to the pressure responsive devices to control the valve.

18. Apparatus for cleaning textiles comprising a tub adapted to contain detergent liquid, means to supply liquid to the tub, means mounted for vertical movement in the tub to support textiles therein, means controlled by said means in accordance with the weight of textiles supported thereby to produce a controlled pressure, a pressure responsive device connected to the last named means to respond to the controlled pressure, a second pressure responsive device connected to the tub to respond to the head of liquid therein, the pressure responsive devices opposing each other, a spring engaging the pressure responsive devices respectively at its opposite ends, means to latch the end of the spring which engages the first named device in the position to which it is moved by the first named device, and means controlled by movement of the second device to control the supply of liquid to the tub.

19. Apparatus for cleaning textiles comprising a substantially vertical tub, a horizontal partition movable vertically in the tub, a cylinder, a piston in the cylinder connected to the partition to reciprocate it vertically, means to supply actuating fluid to the cylinder to reciprocate the piston therein, the cylinder having an intermediate port therein controlled by the piston to cause the piston to hold the partition in an intermediate position when the port is open, a valve controlling the port, a pressure responsive device, means including a valve connecting the pressure responsive device to the cylinder, a second pressure responsive device connected to the tub to respond to the head of liquid therein, a control device operated jointly by the pressure responsive devices, a cover for the tub, means including a supply valve to supply liquid to the tub, means operated by closing of the cover to open the supply valve, and means operated by the control device simultaneously to close the supply valve and the first two named valves.

20. Apparatus for cleaning textiles comprising a tub adapted to contain a detergent liquid, means to supply liquid to the tub, a perforated partition in the tub to support the textiles to be cleaned therein, means mounting the partition for vertical movement in the tub, means controlled by the partition to produce a force proportional to the weight of textiles supported by the partition, and means controlled by said force to control the supply of liquid to the tub.

21. Apparatus for cleaning textiles comprising a tub adapted to contain a detergent liquid, means to supply liquid to the tub, a perforated partition in the tub to support the textiles to be cleaned therein, means mounting the partition for vertical movement in the tub, power means connected to the partition to move it vertically, and means responsive to the downward force exerted on the power means by the partition due to the weight of textiles thereon to control the supply of liquid to the tub.

STERLING O. STAGEBERG.

REFERENCES CITED

The following references are of record in the file of this patent:

UNITED STATES PATENTS

| Number | Name | Date |
| --- | --- | --- |
| 1,886,578 | Pedrazzo | Nov. 8, 1932 |
| 2,135,685 | Wells | Nov. 8, 1938 |
| 2,165,884 | Chamberlin | July 11, 1939 |
| 2,210,246 | Kirkman | Aug. 6, 1940 |
| 2,210,851 | Davis | Aug. 6, 1940 |
| 2,302,836 | Breckenridge | Nov. 24, 1942 |
| 2,305,154 | Gilbert | Dec. 15, 1942 |
| 2,381,894 | Ferris | Aug. 14, 1945 |